United States Patent
Olney et al.

(10) Patent No.: US 10,765,120 B2
(45) Date of Patent: Sep. 8, 2020

(54) HINGED PANEL ASSEMBLY

(71) Applicants: Andrew Olney, Clacakamas, OR (US);
Stephanie Olney, Clacakamas, OR (US)

(72) Inventors: Andrew Olney, Clacakamas, OR (US);
Stephanie Olney, Clacakamas, OR (US)

( * ) Notice: Subject to any disclaimer, the term of this patent is extended or adjusted under 35 U.S.C. 154(b) by 373 days.

(21) Appl. No.: 15/678,191

(22) Filed: Aug. 16, 2017

(65) Prior Publication Data

US 2019/0053500 A1 Feb. 21, 2019

(51) Int. Cl.
*A47J 43/00* (2006.01)
*A21C 15/00* (2006.01)

(52) U.S. Cl.
CPC ..................... *A21C 15/00* (2013.01)

(58) Field of Classification Search
CPC .............................. A21C 15/00; A47G 19/265
USPC ........................................................... 99/645
See application file for complete search history.

(56) References Cited

U.S. PATENT DOCUMENTS

| 168,437 | A | | 10/1875 | Wells | |
|---|---|---|---|---|---|
| 925,489 | A | | 6/1909 | Lindsay | |
| 2,546,800 | A | * | 3/1951 | Thiac | A47G 19/265 99/645 |
| 2,598,789 | A | | 6/1952 | Harrell | |
| 2,617,350 | A | | 11/1952 | Shol | |
| 2,716,066 | A | * | 8/1955 | Baker | A47G 19/265 99/516 |
| 3,677,168 | A | | 7/1972 | Bell | |
| D641,218 | S | | 7/2011 | Galea | |

FOREIGN PATENT DOCUMENTS

WO WO2006077678 7/2006

\* cited by examiner

*Primary Examiner* — Hung D Nguyen

(57) ABSTRACT

A hinged panel assembly includes a first panel that is selectively positioned against a first exposed surface of a cake when the cake has been cut. The first panel is comprised of a fluid impermeable material to inhibit air from contacting the first exposed surface thereby enhancing freshness of the cake. A second panel is hingedly coupled to the first panel such that the second panel is selectively positioned at a selected angle with respect to the first panel. The second panel is selectively positioned against a second exposed surface of a cake when the cake has been cut. The second panel is comprised of a fluid impermeable material to inhibit air from contacting the second exposed surface thereby enhancing freshness of the cake.

4 Claims, 4 Drawing Sheets

HINGED PANEL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to panel devices and more particularly pertains to a new panel device for enhancing freshness of a cake when the cake has been cut.

BRIEF SUMMARY OF THE INVENTION

An embodiment of the disclosure meets the needs presented above by generally comprising a first panel that is selectively positioned against a first exposed surface of a cake when the cake has been cut. The first panel is comprised of a fluid impermeable material to inhibit air from contacting the first exposed surface thereby enhancing freshness of the cake. A second panel is hingedly coupled to the first panel such that the second panel is selectively positioned at a selected angle with respect to the first panel. The second panel is selectively positioned against a second exposed surface of a cake when the cake has been cut. The second panel is comprised of a fluid impermeable material to inhibit air from contacting the second exposed surface thereby enhancing freshness of the cake.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
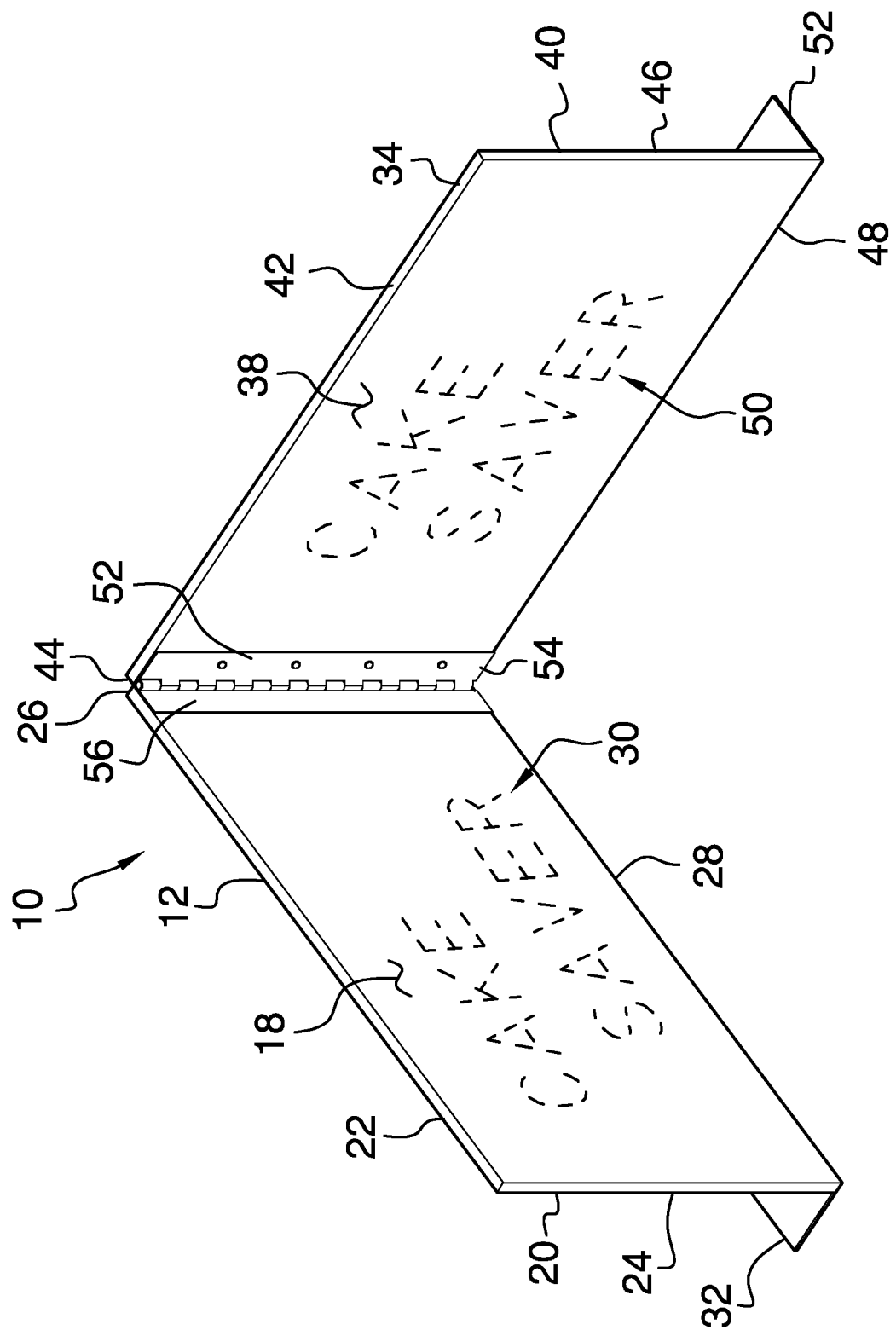
FIG. 1 is a front perspective view of a hinged panel assembly according to an embodiment of the disclosure.
Figure 2:
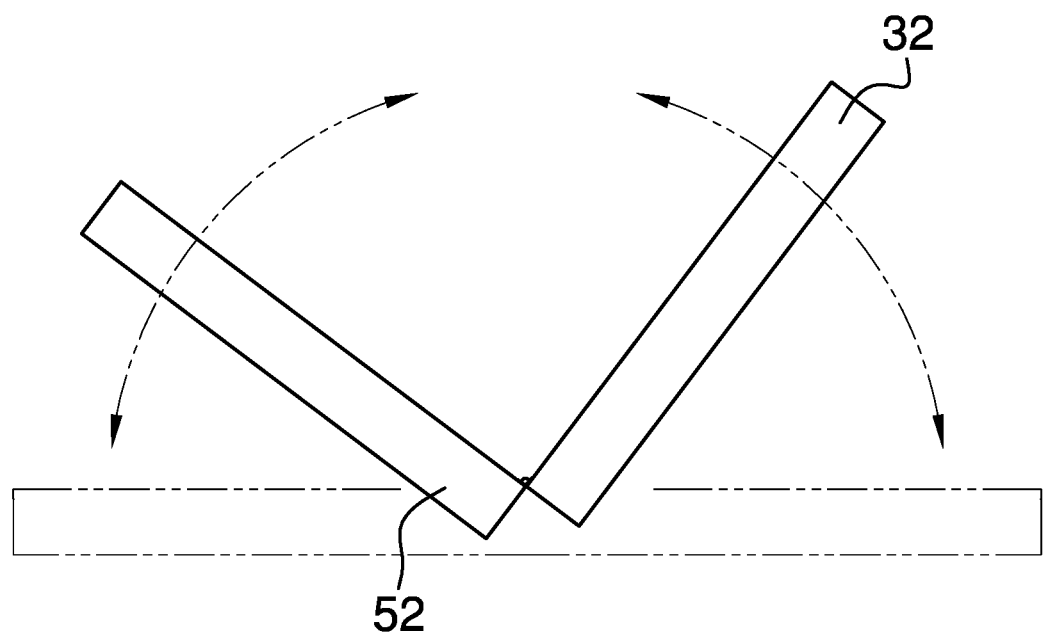
FIG. 2 is a bottom view of an embodiment of the disclosure.
Figure 3:
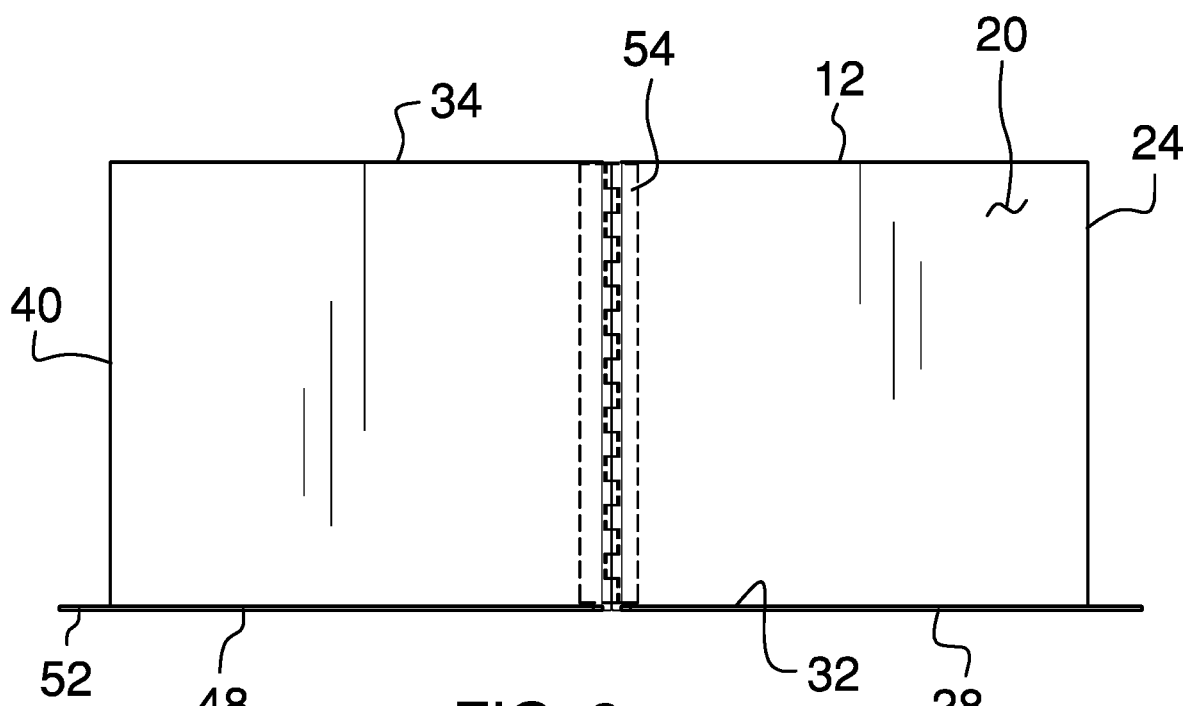
FIG. 3 is a back view of an embodiment of the disclosure.
Figure 4:
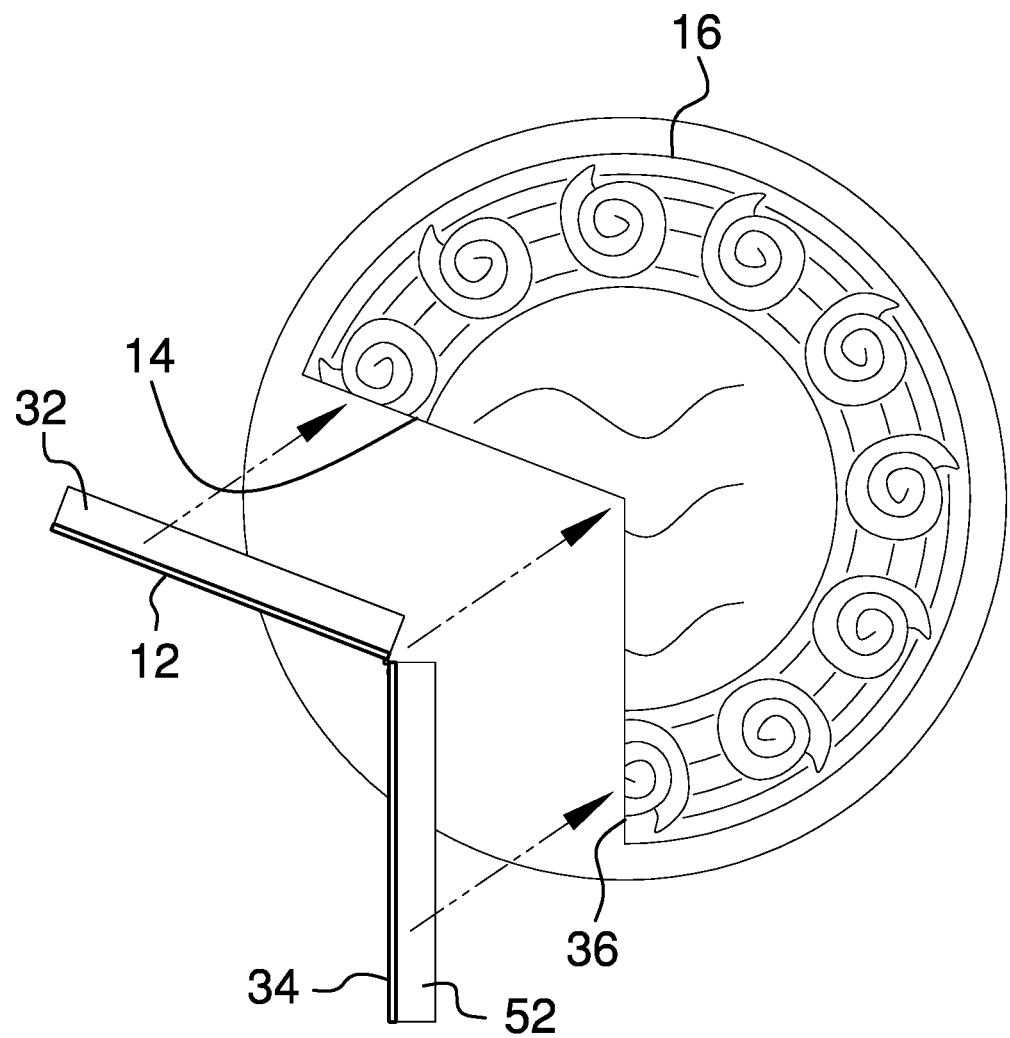
FIG. 4 is a perspective in-use view of an embodiment of the disclosure.
Figure 5:
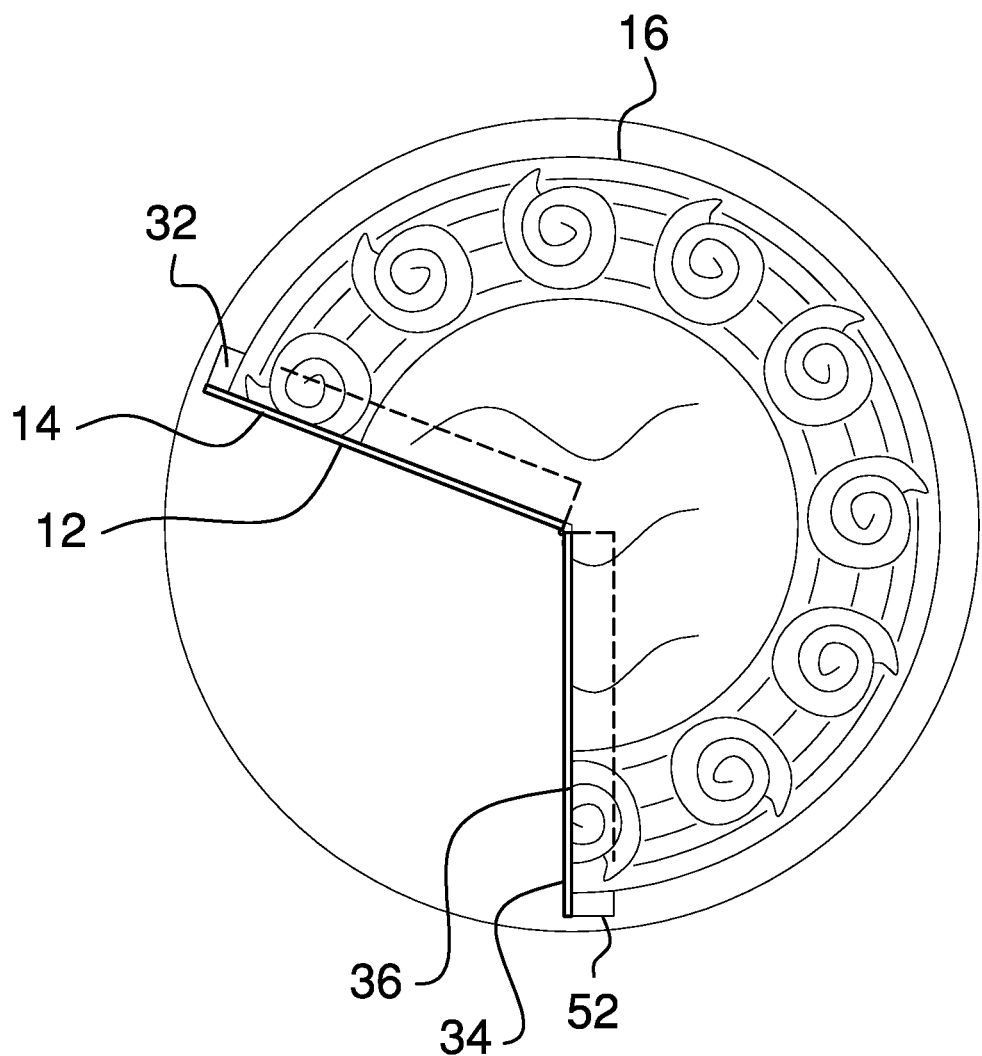
FIG. 5 is a top perspective in-use view of an embodiment of the disclosure.

With reference now to the drawings, and in particular to FIGS. 1 through 5 thereof, a new panel device embodying the principles and concepts of an embodiment of the disclosure and generally designated by the reference numeral 10 will be described.

As best illustrated in FIGS. 1 through 5, the hinged panel assembly 10 generally comprises a first panel 12. The first panel 12 is selectively positioned against a first exposed surface 14 of a cake 16 when the cake 16 has been cut. The first panel 12 is comprised of a fluid impermeable material to inhibit air from contacting the first exposed surface 14. In this way the first panel 12 enhances freshness of the cake 16.

The first panel 12 has a first surface 18, a second surface 20 and a peripheral edge 22 extending therebetween. The peripheral edge 22 has a first lateral side 24, a second lateral side 26 and a bottom side 28. Moreover, the first panel 12 is elongated between the first lateral side 24 and the second lateral side 26. The first surface 18 abuts the first exposed surface 14 of the cake 16 and the second surface 20 has indicia 30 printed thereon. The indicia 30 comprising words and the words may comprise "cake saver".

A first lip 32 is coupled to and extends away from the first panel 12. The first lip 32 is positioned beneath the cake 16 when the first panel 12 is positioned against the cake 16. In this way the first lip 32 retains the first panel 12 in a vertical orientation against the cake 16. The first lip 32 is positioned on the first surface 18 of the first panel 12. Additionally, the first lip 32 is coextensive with the bottom side 28 of the first panel 12.

A second panel 34 is hingedly coupled to the first panel 12 such that the second panel 34 is selectively positioned at a selected angle with respect to the first panel 12. The second panel 34 is positioned against a second exposed surface 36 of a cake 16 when the cake 16 has been cut. Additionally, the second panel 34 is comprised of a fluid impermeable material to inhibit air from contacting the second exposed surface 36. In this way the second panel 34 enhances freshness of the cake 16.

The second panel 34 has a first surface 38, a second surface 40 and a peripheral edge 42 extending therebetween. The peripheral edge 42 of the second panel 34 has a first lateral side 44, a second lateral side 46 and a bottom side 48. Moreover, the second panel 34 is elongated between the first lateral side 44 and the second lateral side 46 of the second panel 34. The first surface 38 of the second panel 34 abuts the second exposed surface 36 of the cake 16 and the second surface 40 of the second panel 34 has indicia 50 printed thereon. The indicia 50 corresponding to the second panel 34 comprising words and the words on the second panel 34 may comprise "cake 16 saver".

A second lip 52 is coupled to and extends away from the second panel 34. The second lip 52 is positioned beneath the cake 16 when the second panel 34 is positioned against the cake 16. In this way the second lip 52 retains the second panel 34 in a vertical orientation against the cake 16. The second lip 52 is positioned on the first surface 38 of the second panel 34. Additionally, the second lip 52 is coextensive with the bottom side 48 of the second panel 34.

A hinge 54 has a first half that 56 is hingedly coupled to a second half 58. The first half 56 is coupled to the first surface 18 of the first panel 12 and the first half 56 is aligned with the second lateral side 24 of the first panel 12. The second half 58 is coupled to the first surface 38 of the second panel 34 and the second half 58 is aligned with the first lateral side 44 of the second panel 34. The hinge 54 may be a mechanical hinge 54 of any conventional design.

In use, the first panel 12 is positioned against the first exposed surface 14 of the cake 16 when the cake 16 is cut. Thus, the first panel 12 inhibits the first exposed surface 14 of the cake 16 from drying out thereby enhancing freshness of the cake 16. The second panel 34 is manipulated to abut the second exposed surface 36 of the cake 16 when the cake 16 is cut. Thus, the second panel 34 inhibits the second exposed surface 36 of the cake 16 from drying out thereby enhancing freshness of the cake 16. The second panel 34 is manipulated to abut the second exposed surface 36 of the cake 16 every time the cake 16 is cut thereby facilitating both of the first and second surfaces of the cake 16 to be covered.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A hinged panel assembly being configured to be placed against cut sides of a cake thereby retaining freshness of the cake, said assembly comprising:

a first panel being configured to be positioned against a first exposed surface of a cake when the cake has been cut, said first panel being comprised of a fluid impermeable material wherein said first panel is configured to inhibit air from contacting the first exposed surface thereby enhancing freshness of the cake, said first panel having a first surface, a second surface and a peripheral edge extending therebetween, said peripheral edge having a first lateral side, a second lateral side and a bottom side, said first panel being elongated between said first lateral side and said second lateral side, said first surface being configured to abut the first exposed surface of the cake, said second surface having indicia being printed thereon, said indicia comprising words;

a first lip being coupled to and extending away from said first panel wherein said first lip is configured to be positioned beneath the cake, said first lip being positioned on said first surface of said first panel, said first lip being coextensive with said bottom side of said first panel, said first lip having a uniform width along a length of said first lip wherein a distal edge of said first lip is parallel to said bottom side of said first panel; and a second panel being hingedly coupled to said first panel such that said second panel is selectively positioned at a selected angle with respect to said first panel, said second panel being configured to be positioned against a second exposed surface of a cake when the cake has been cut, said second panel being comprised of a fluid impermeable material wherein said second panel is configured to inhibit air from contacting the second exposed surface thereby enhancing freshness of the cake.

2. The assembly according to claim 1, wherein said second panel has a first surface, a second surface and a peripheral edge extending therebetween, said peripheral edge of said second panel having a first lateral side, a second lateral side and a bottom side, said second panel being elongated between said first lateral side and said second lateral side of said second panel, said first surface of said second panel being configured to abut the second exposed surface of the cake, said second surface of said second panel having indicia being printed thereon, said indicia corresponding to said second panel comprising words.

3. The assembly according to claim 2, further comprising a second lip being coupled to and extending away from said second panel wherein said second lip is configured to be positioned beneath the cake, said second lip being positioned on said first surface of said second panel, said second lip being coextensive with said bottom side of said second panel, said second lip having a uniform width along a length of said second lip wherein a distal edge of said second lip is parallel to said bottom side of said second panel.

4. The assembly according to claim 2, further comprising a hinge having a first half being hingedly coupled to a second half, said first half being coupled to said first surface of said first panel, said first half being aligned with said second lateral side of said first panel, said second half being coupled to a first surface of said second panel, said second half being aligned with a first lateral side of said second panel.

* * * * *